United States Patent [19]
Wenz

[11] 3,805,224
[45] Apr. 16, 1974

[54] METHOD AND APPARATUS FOR MONITORING BIOLOGICAL ACTIVITY

[75] Inventor: Robert C. Wenz, Hanover, Mass.

[73] Assignee: Alpine Geophysical Associates, Inc., Norwood, N.J.

[22] Filed: Nov. 24, 1972

[21] Appl. No.: 309,181

[52] U.S. Cl.................. 340/3 R, 340/3 D, 340/5 R
[51] Int. Cl.............................................. G01s 9/66
[58] Field of Search........... 73/69, 70; 340/1 C, 1 R, 340/3 D, 3 R, 258 A, 258 B, 261, 5 R; 343/5 PD; 181/0.5 AP, 0.5 NP; 119/3, 5

[56] References Cited
UNITED STATES PATENTS
3,513,463   5/1970   Stevenson, Jr. et al......... 340/258 A FOREIGN PATENTS OR APPLICATIONS
656,399   8/1951   Great Britain.................... 343/5 PD Primary Examiner—Richard A. Farley
Attorney, Agent, or Firm—Davis, Hoxie, Faithfull & Hapgood

[57] ABSTRACT

The physical activity of biological specimens in an environmental medium is monitored by setting up a standing pattern of ultrasonic acoustic waves in the environmental medium. As the biological specimens move about in the environment, they disturb the standing wave pattern. These distrubances are monitored to produce output indications of the degree of biological activity. The quality of an environmental medium is indicated by monitoring the activity of biological specimens in a controlled sample of that medium.

27 Claims, 4 Drawing Figures

METHOD AND APPARATUS FOR MONITORING BIOLOGICAL ACTIVITY

BACKGROUND OF THE INVENTION

This invention relates to monitoring biological activity, and more particularly to monitoring the physical activity of animal life. The invention has particular application to monitoring the physical activity of aquatic specimens (e.g., fish) in a closed environment such as an aquarium. The quality of an environmental medium is monitored by observing the physical activity of biological specimens in the medium or in a controlled sample of the medium.

As used herein the term biological specimens means live animal specimens having significant physical mobility and of sufficient size to interact with acoustic waves in the manner described.

There are a number of applications in which it is desirable to be able to measure the activity of biological specimens. In monitoring the quality of water in the environment, for example, the physical activity of aquatic life (e.g., fish) exposed to the water provides a measure of water quality. The activity of most kinds of fish is highly dependent on such factors as the temperature, oxygen content, and level of contaminants in the surrounding water. The activity of fish in a body of water can therefore be used to provide an indication of pollution levels in the body of water. By placing the fish in a controlled environment such as an aquarium and supplying water to the aquarium from a source of water to be monitored, the quality of water from the source can be monitored by measuring the activity of the fish in the aquarium. The source of water may be a stream or lake or the effluent of a potentially polluting industrial process.

Biological specimens also respond to a wide variety of stimuli with increased or decreased activity or with activity of a particular kind. Again taking the example of aquatic life, fish move in response to a wide variety of sensory stimuli such as light and sound. Accordingly, many aspects of the behavior of fish can be studied by monitoring their physical activity. Similarly, properties of pharmaceuticals can be tested by introducing them into the aquatic medium and observing the effect on the movement of specimens in that environment. Studies of motion are also an important tool in many phases of experimental biology, e.g., in studying the behavior patterns and learning ability of various species.

Heretofore it has been very difficult to accurately monitor biological activity. One technique involves the use of photoelectric devices in conjunction with light sources. Interruptions of the light impinging on the photoelectric devices are counted or otherwise monitored to provide an indication of the level of biological activity. Among the difficulties with this technique is that the required light sources constitute a sensory input to the biological environment which may disturb the specimens under study. Studies cannot be conducted in the dark or on specimens which spend much of their time in hiding places or close to the bottom in aquatic environments. Techniques involving human observation are highly subjective and cannot be conveniently used to monitor biological activity over long periods or biological activity involving gradual or subtle changes.

In an article entitled "Ultrasonic Recorder for Locomotor Activity Studies" (*Transactions of the American Fisheries Society*, Vol. 97, No. 1, 1968), P. Meffert describes the use of ultrasonic acoustic pulses and the Doppler effect to monitor the activity of sharks. In the Meffert apparatus a transmitting transducer is used to transmit discrete, unipolar ultrasonic pulses into the environmental medium. These pulses are reflected by the shark and received by receiving transducers located elsewhere in the medium. The phase relationship between the pulses as transmitted and received is monitored. Changes in this relationship (e.g., due to the Doppler effect) are detected to indicate significant activity on the part of the shark or sharks. Pulses reflected by the boundaries of the environment (e.g., the walls of the test tank) are considered spurious and are ignored.

There are a number of difficulties associated with the use of discrete pulses and phase detection in the measurement of biological activity. Among these are the difficulty of determining which of many received pulses are spurious and which are to be compared to the transmitted pulses to establish the required phase relationship. To overcome this problem, Meffert employs three receiving transducers and a complicated system for switching from one to another based on received pulse amplitude.

It is therefore an object of this invention to improve and simplify the monitoring of biological activity.

It is a more particular object of this invention to provide improved apparatus for monitoring the physical activity of biological specimens in an environmental medium.

It is another object of this invention to provide a method for monitoring the quality of an environmental medium by observing the physical activity of biological specimens in that medium.

SUMMARY OF THE INVENTION

These and other objects of the invention are accomplished in accordance with the principles of the invention by monitoring the effect of a biological specimen or specimens on a standing pattern of ultrasonic acoustic waves in the environmental medium surrounding the specimens. More particularly, apparatus is provided for radiating ultrasonic acoustic waves into the environmental medium. These waves are reflected, either by the natural boundaries of the environment or by reflecting baffles introduced into the environment, to produce a standing wave pattern in the environment. The amplitude of the acoustic waves at a predetermined point in this pattern is sensed by receiving apparatus. As the specimens being monitored move about in the environmental medium, they disturb the standing wave pattern, producing changes in the amplitude of the acoustic waves sensed by the receiving apparatus. When a sufficiently significant change of amplitude is sensed, an output signal pulse indicative of significant biological activity is produced. The number of such pulses produced in any given time interval (i.e., the frequency of the pulses) is a measure of biological activity during that time interval. A counter is conveniently employed to count these pulses as they are produced. In addition, apparatus may be provided for periodically recording the count registered by the counter and resetting the counter to zero.

The quality of an environmental medium is monitored by measuring the activity of known biological specimens in the medium or in a controlled sample of the medium using apparatus of the type described above.

Further features and objects of the invention, its nature and various advantages will be more apparent from the attached drawing and the following detailed description of the invention.

DETAILED DESCRIPTION OF THE INVENTION

Figure 1:
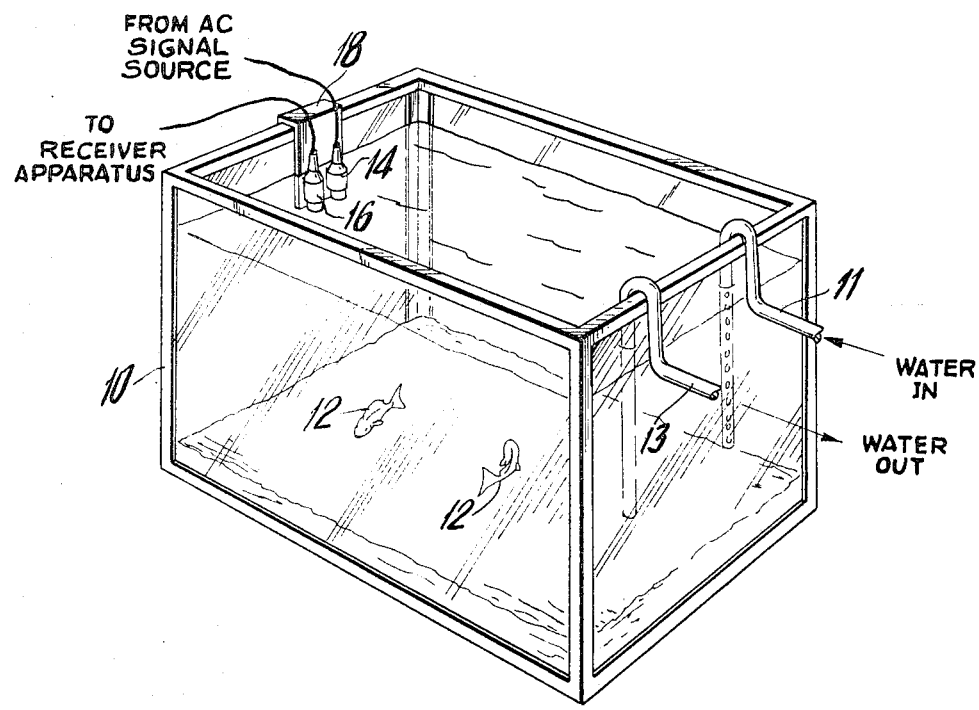
FIG. 1 illustrates the application of the principles of the invention to monitoring the physical activity of fish in an aquarium.

Although it will be understood that the principles of this invention are applicable to monitoring the activity of a wide variety of biological specimens in any of a number of environmental media, the invention is adequately described by explanation of an embodiment for monitoring the activity of fish in a water filled container such as an aquarium. Accordingly, FIG. 1 shows an aquarium 10 containing water as an environmental medium for a number of fish 12. At one end of aquarium 10 is a bracket 18 on which are mounted high frequency, electroacoustic transducers 14 and 16 (also shown in FIGS. 2 and 3). Transducers 14 and 16 are transmitting and receiving transducers, respectively. Both transducers are mounted with their acoustically active portions in the water in aquarium 10. If the apparatus is being used to monitor the quality of water from a source (not shown), water from that source may be introduced into the aquarium either periodically or continuously so that the water in the aquarium constitutes a sample of the water to be monitored. For example, water from the source to be monitored may be introduced directly into aquarium 10 at a predetermined rate by way of pipe 11. Alternatively, water from the source to be monitored may be mixed in predetermined proportion with water of known quality and the mixture introduced into the aquarium at the predetermined rate. In either event, water is conveniently withdrawn from the aquarium at the same rate by way of another pipe 13 so that the level of water in the aquarium remains constant.

Figure 2:
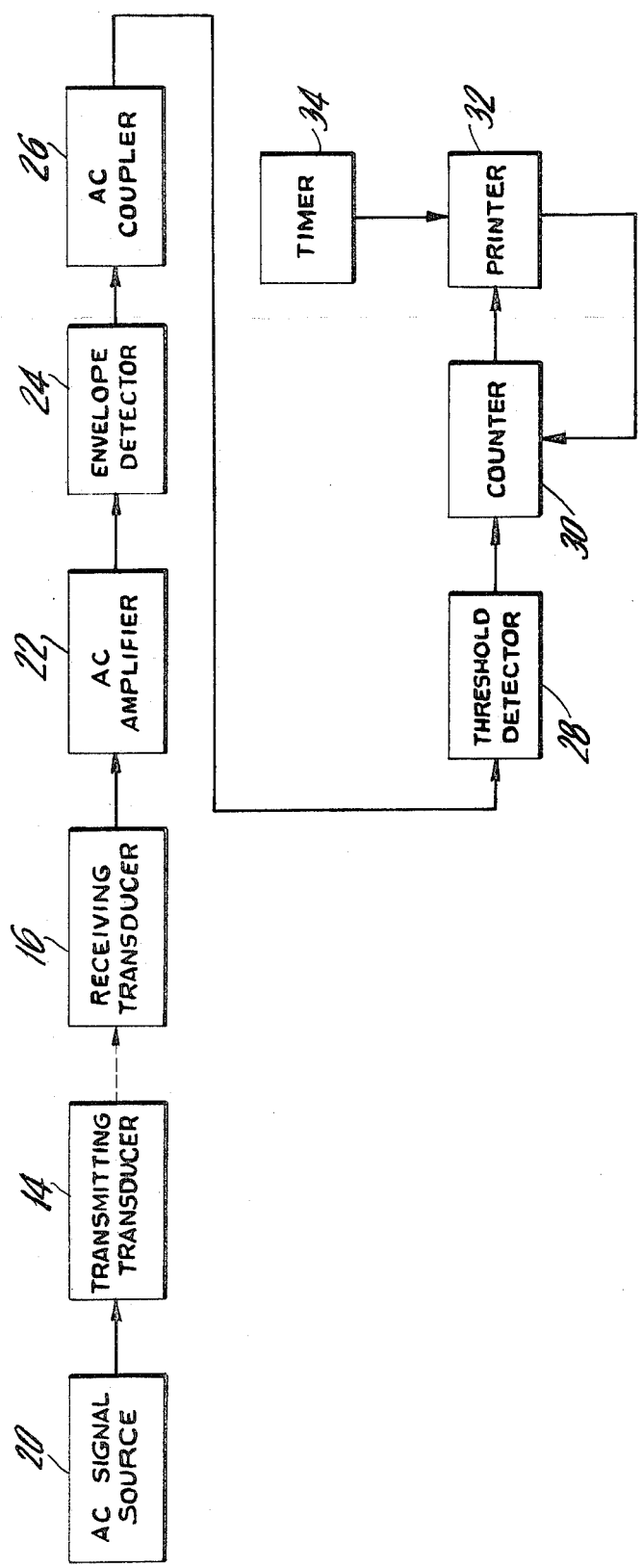
FIG. 2 is a block diagram of apparatus for monitoring biological activity constructed in accordance with the principles of this invention.
Figure 3:
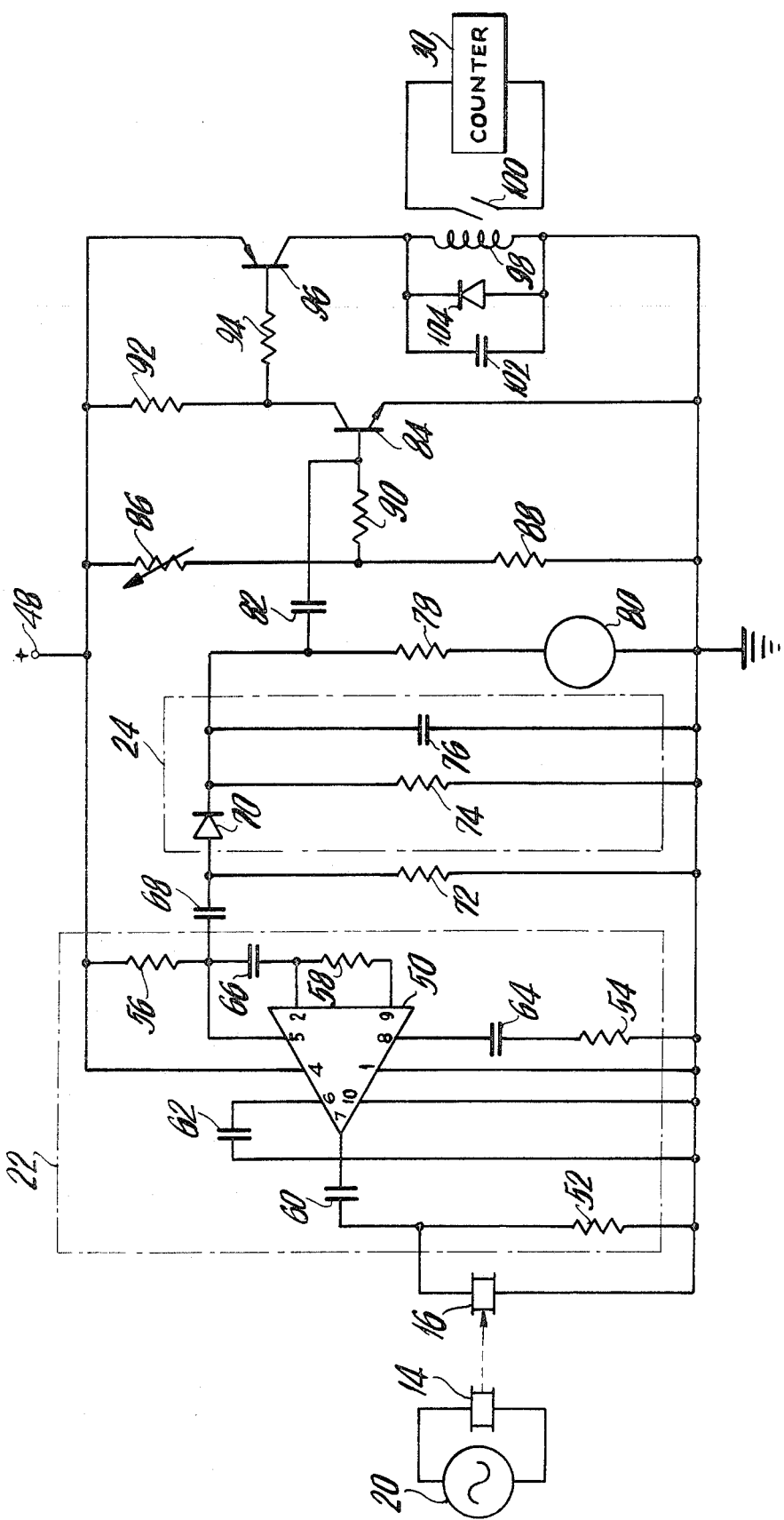
FIG. 3 is a schematic diagram of one possible electrical circuit for realizing the apparatus of FIG. 2.

Transmitting transducer 14, which (as shown in FIGS. 2 and 3) is connected to a source 20 of alternating current (AC) electrical signals, radiates ultrasonic acoustic waves into the surrounding water. In accordance with the principles of this invention, these waves are advantageously continuous, bipolar (e.g., sinusoidal) acoustic waves of predetermined constant frequency. The frequency employed will depend on the application. For example, it is generally desirable in monitoring the activity of aquatic specimens (e.g., fish 12) to choose a frequency such that the resulting wavelength is on the same order of magnitude as the overall dimensions of the specimens being monitored. In an application involving monitoring gold fish approximately 2 inches in length, frequencies between 50 and 52 KHz were found to be satisfactory. In all cases, it is desirable that the acoustic waves be ultrasonic, i.e., beyond the upper limit of hearing of the specimens being monitored. in this way the specimens are not appreciably disturbed or influenced by the acoustic waves. Ultrasonic acoustic waves also penetrate many natural obstacles so that specimens preferring hiding places such as rock or coral structures can be monitored as readily as fish 12.

The acoustic waves radiated by transducer 14 are reflected by the sides and bottom of aquarium 10, as well as by the free surface of the water, to create a standing wave pattern in the aquarium. In general this standing wave pattern is quite complex, depending, for example, on the properties of transducer 14 and the size and shape of aquarium 10. The standing wave pattern need not be perfectly stable, but may fluctuate to some degree even in the absence of any biological activity as long as these fluctuations are small or gradual as compared to changes in the wave pattern caused by biological activity in the aquarium.

Transducer 16 is a receiving transducer matched to transmitting transducer 14. Receiving transducer 16 converts high frequency acoustic energy in the water in aquarium 10 into an AC output signal applied to receiving apparatus discussed in detail below. The frequency and amplitude of the output signal of receiving transducer 16 are dependent respectively on the frequency and amplitude of the standing wave pattern at the location of the active element of transducer 16. Although not necessarily the case, receiving transducer 16 is conveniently located at a null or low energy point in the standing wave pattern in aquarium 10. This can be accomplished by appropriately "tuning" transmitting transducer 14 (i.e., making small adjustments in the frequency of the transmitted acoustic waves), by physically moving receiving transducer 16 until a null is found, or by making both types of adjustments. With receiving transducer 16 at a null in the standing wave pattern, the AC output signal amplitude of the transducer is at a minimum.

As fish 12 move about in the water of aquarium 10, they disturb the pattern of standing acoustic waves set up in the aquarium by transmitting transducer 14. These disturbances of the standing wave pattern are the result, for example, of reflection and refraction of the acoustic waves by the fish. The resulting changes in the standing wave pattern produce fluctuations in the amplitude of the acoustic waves at receiving transducer 16. This in turn causes the output signal of transducer 16 to fluctuate in amplitude. If receiving transducer 16 is initially at a null in the standing wave pattern, the transducer receives more energy as the standing wave pattern changes and that particular null is displaced. The more active the fish become, the more the amplitude of the acoustic waves at transducer 16 fluctuates. The fluctuations in the energy received by transducer 16 typically reflect both the distances moved by fish 12 and the rapidity of those movements. Changes in the amplitude of the AC output signal of transducer 16 are therefore monitored in accordance with the principles of this invention to provide a measure of the activity of fish 12.

As shown in FIG. 2, the AC output signal of receiving transducer 16 is amplified by AC amplifier 22 and the amplified signal is applied to envelope detector 24. Envelope detector 24 produces an output signal representative of the amplitude of the applied AC signal. Accordingly, the output signal of envelope detector is a fluctuating direct current type signal representative of the amplitude of the acoustic waves received by transducer 16. Envelope detector 24 may be any apparatus (e.g., a low pass filter) capable of producing an output signal representative of the amplitude of an applied AC signal.

The output signal of envelope detector 24 is applied to AC coupler 26 which passes only the fluctuating or AC component of the applied signal. AC coupler 26 therefore produces an output signal indicative of fluctuations or variations in the output signal of envelope detector 24 and thus in the amplitude of the acoustic waves received by transducer 16. The output signal of AC coupler 26 is applied to threshold detector 28 which compares the amplitude of the applied signal to a predetermined reference or threshold level. When the output signal of envelope detector 24 changes to a sufficient degree sufficiently rapidly, the output signal of AC coupler 26 exceeds the predetermined threshold level and threshold detector 28 produces an output signal pulse counted by counter 30. This occurs each time one or more of fish 12 moves significantly and with sufficient rapidity. Indeed, if a fish moves a sufficient distance, several pulses may be produced by threshold detector 28 and counted by counter 30. Accordingly, the number of pulses counted by counter 30 in any given time interval (i.e., the frequency of the pulses produced by threshold detector 28) is a measure of the physical activity of fish 12 during that time interval. As shown in FIG. 2, apparatus (e.g., printer 32) may be provided for periodically displaying or recording the count registered by counter 32 in response to timing signal pulses produced by timer 34. In that event, counter 30 is conveniently reset to a count of zero each time the count has been recorded.

FIG. 3 is a schematic diagram of one possible circuit for realizing the apparatus shown in block diagram form in FIG. 2. As mentioned above, AC signal source 20 and transducer 14 constitute the transmitting apparatus used to set up a standing pattern of ultrasonic acoustic waves in an environmental medium (e.g., the water in aquarium 10). Signal generator 20 may be any, preferably stable, high frequency oscillator. Signal generator 20 may in addition be an oscillator of adjustable frequency as an aid to tuning the apparatus for various conditions and applications.

As indicated by the broken line from transducer 14 to transducer 16 in FIG. 3, some of the acoustic energy transmitted by transducer 14 is received by transducer 16. One terminal of receiving transducer 16 is connected to ground and the other terminal is connected to an AC amplifier circuit, i.e., the elements surrounded by broken line 22. Amplifier circuit 22 includes a commercially available integrated circuit amplifier 50 type TAA-300 available from Allied Radio Shack Division of Tandy Corporation, together with resistors 52, 54, 56, and 58 and capacitors 60, 62, 64, and 68 connected in circuit relation to amplifier 50 in an arrangement suggested in Archer (Radio Shack) Technical Data Sheet 276-016. Driving current for amplifier 22 (as well as for the remainder of the receiver circuit) is provided by a source of positive potential connected to terminal 48.

The output signal of amplifier 22 is AC coupled to an envelope detector circuit (i.e., the elements surrounded by broken line 24) by capacitor 68 and resistor 72. Envelope detector circuit 24 includes diode 70 for rectifying the applied AC signal and resistor 74 and capacitor 76 for smoothing or low pass filtering the rectified signal. Envelope detector 24 therefore produces and output signal representative of the envelope of the output signal of amplifier 22. The level of this output signal is conveniently monitored by meter 80 connected in series with resistor 78 across the output terminals of detector 24 as shown. Meter 80 is useful in tuning the system (e.g., in locating receiving transducer 16 at a null in the standing wave pattern set up by transmitting transducer 14) and in monitoring the operation of the system to insure its proper performance.

The output signal of threshold detector 24 is AC coupled to the base of transistor 84 by capacitor 82. Voltage dividing resistors 86 and 88, coupled to the base of transistor 84 by resistor 90, keep transistor 84 normally cut off or non-conducting. While transistor 84 is thus cut off, resistors 92 and 94 hold off transistor 96. As long as transistor 96 is cut off, no current flows through coil 98 and relay contacts 100 remain open.

When the output potential of envelope detector 24 rises by a sufficient amount sufficiently rapidly (in response to a sufficiently significant movement of the fish in aquarium 10), AC coupling capacitor 82 momentarily raises the potential at the base of transistor 84 above the cut off threshold of that device, causing transistor 84 to conduct. When transistor 84 conducts, transistor 96 also conducts and the resulting flow of current through relay coil 98 causes relay contacts 100 to close. The closing of relay contacts 100 causes counter 30 to advance. When the output potential of envelope detector stops rising or drops back, transistors 84 and 96 are again cut off, relay contacts 100 re-open, and the system is restored to the initially described condition.

In effect, transistor 84 and the associated resistors act as a threshold detector, responding only when the output signal level of capacitor 82 is sufficiently high to overcome the bias established by the resistors. The threshold thus established (and accordingly the sensitivity of the apparatus) is conveniently made adjustable by making resistor 86, for example, variable.

Elements 98 and 100 may be the coil and contacts, respectively, of a reed relay device. Capacitor 102 is connected in parallel with coil 98 as shown to slightly extend the closure time of the relay. Diode 104 is included to suppress the reverse transient which occurs when coil 98 is de-energized In a system in which transducers 14 and 16 are operated at frequencies of 50 to 52 KHz, typical values for the elements in the circuit of FIG. 3 are as follows:

| | | |
|---|---|---|
| Resistors | 52 | 1 K-ohms |
| | 54 | 47 ohms |
| | 56 | 470 ohms |
| | 58 | 68 K-ohms |
| | 72 | 10 K-ohms |
| | 74 | 10 K-ohms |
| | 78 | 1.5 K-ohms |
| | 86 | 100 K-ohms (trim) |
| | 88 | 6.2 K-ohms |
| | 90 | 470 ohms |
| | 92 | 2.2 K-ohms |
| | 94 | 330 ohms |
| Capacitors | 60 | 3.3 uf |
| | 62 | 150 uf |
| | 64 | 47 uf |
| | 66 | 100 uf |
| | 68 | 4.7 uf |
| | 76 | 3.3 uf |
| | 82 | 330 uf |
| | 102 | 47 uf |

Diodes 70 and 104 are both type 1N4446. Transistors 84 and 96 are type 2N4124 and type 2N4126, respectively. Amplifier 50 is an integrated circuit amplifier type TAA-300 available as described above. The terminals of amplifier 50 are labelled in FIG. 3 as designated by the manufacturer. Coil 98 and contacts 100 are elements of a reed relay type MMRC 2020 available from C. P. Clare and Company. Meter 80 is a conventional ammeter reading from 0 to 100 $\mu$ amps. A positive potential of 9 volts DC is applied to terminal 48.

Figure 4:
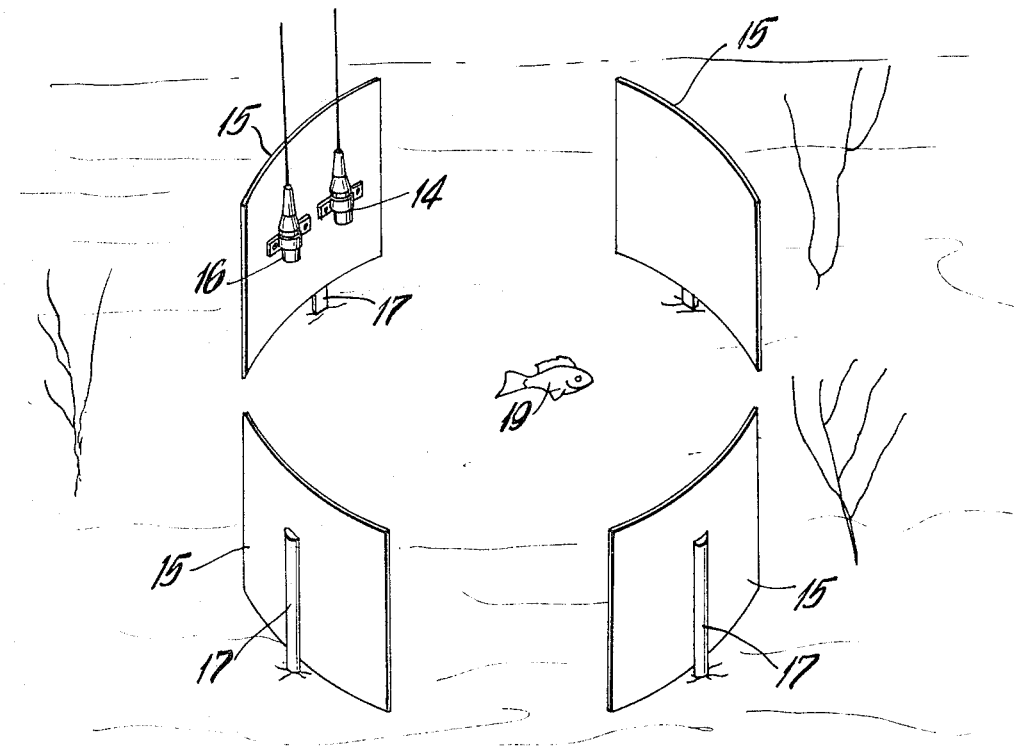
FIG. 4 illustrates the application of the principles of this invention to monitoring the physical acitivity of biological specimens in the open environment.

It is to be understood that the embodiments shown and described herein are illustrative of the principles of the invention only, and that various modifications may be implemented by those skilled in the art without departing from the spirit and scope of the invention. For example, other circuit components can be substituted for those mentioned specifically above. Moreover, although the invention has been described in its application to monitoring the activity of fish in an aquarium, the principles of the invention are equally applicable to monitoring the activity of any of a wide variety of biological specimens in any of a wide variety of environmental media (e.g., fresh water, salt water, air, etc.). When the environment is not closed as in the case of an aquarium, baffles or reflecting surfaces may be introduced into the environmental medium (as shown, for example, in FIG. 4) to create a region in which there is a standing pattern of ultrasonic acoustic waves and in which biological activity can be monitored in accordance with the principles of this invention. In FIG. 4, transmitting and receiving transducers 14 and 16 are mounted on one of a plurality of baffles 15 near the bottom of an essentially infinite aquatic environment (e.g., a lake or stream). The locations of baffles 15 are fixed by mounting them on stakes 17 driven into the bottom of the environment. Baffles 15 are designed to reflect high frequency acoustic energy radiated by transmitting transducer 14 and to confine a high percentage of this energy to the region bounded by them. This creates a standing wave pattern in this region similar to that set up in aquarion 10 in the embodiment shown in FIG. 1. Accordingly, biological activity in this region (e.g., the activity of fish 19) can be monitored in exactly the same way that biological activity is monitored in the aquarium of the previously described embodiment.

What is claimed is:

1. The method of monitoring the physical activity of biological specimens in an environmental medium comprising the steps of:
   establishing a standing pattern of ultrasonic acoustic waves in said environmental medium;
   detecting variations in the amplitude of said acoustic waves at a predetermined point in said environmental medium due to physical movement of said biological specimens; and
   counting the number of said variations in successive substantially equal intervals of time to produce an output indication of the frequency of said variations as a measure of the level of physical activity of the biological specimens.

2. The method of monitoring the physical activity of aquatic animals in a aquatic medium comprising the steps of:
   establishing a standing pattern of ultrasonic acoustic waves in said aquatic medium;
   detecting variations in the amplitude of said acoustic waves at a predetermined point in said aquatic medium due to physical movement of said aquatic animals; and
   counting the number of said variations in successive substantially equal intervals of time to produce an output indication of the frequency of said variations as a measure of the level of physical activity of the aquatic animals.

3. The method of measuring the quality of a sample of water including at least one aquatic animal comprising the steps of:
   establishing a standing pattern of ultrasonic acoustic waves in said sample of water;
   detecting variations in the amplitude of said acoustic waves at a predetermined point in said sample due to physical movement of said aquatic animal; and
   counting the number of said variations in successive substantially equal intervals of time to produce an output indication of the frequency of said variations as a measure of the degree of physical movement of said aquatic animal.

4. The method of monitoring the quality of a water resource comprising the steps of:
   diverting a portion of said water through a zone in which at least one aquatic animal is constrained;
   establishing a standing pattern of ultrasonic acoustic waves in said zone;
   detecting variations in the amplitude of said acoustic waves due to physical movement of said aquatic animal;
   counting the number of said variations in successive substantially equal intervals of time to provide a measure of the rates of physical activity of said aquatic animal; and
   detecting changes in said rates as an indication of changes in the quality of said water.

5. Apparatus for monitoring the level of physical activity of biological specimens in an environmental medium comprising:
   means for establishing a standing pattern of ultrasonic acoustic waves in said environmental medium;
   first means for producing an output signal indicative of variations in the amplitude of said acoustic waves at a predetermined point in said environmental medium due to physical movement of said biological specimens; and
   second means responsive to the output signal of said first means for indicating the frequency of said variations as a measure of the level of physical activity of said biological specimens.

6. The apparatus defined in claim 5 wherein said second means comprises:
   a counter responsive to the output signal of said first means for counting said variations;
   means for periodically recording the count registered by said counter; and
   means for resetting said counter each time the count has been recorded.

7. The apparatus defined in claim 5 wherein said first means comprises:
   third means for producing an output signal indicative of the amplitude of said acoustic waves at said predetermined point in said environmental medium;

AC coupling means for producing an output signal indicative of variations in the output signal of said third means; and threshold detecting means for producing an output signal pulse applied to said second means when the output signal of said AC coupling means exceeds a predetermined threshold level.

8. The apparatus defined in claim 7 wherein said second means comprises:

a counter for counting the output pulses of said threshold detecting means;

means for periodically recording the count registered by said counter; and means for resetting said counter each time the count has been recorded.

9. The apparatus defined in claim 5 wherein said means for establishing comprises:

transmitter means for transmitting ultrasonic acoustic waves into said environmental medium and surfaces disposed in the environmental medium for reflecting the acoustic waves transmitted by said transmitter means to produce said standing wave pattern in the environmental medium.

10. Apparatus for monitoring the physical activity of aquatic animals in an aquatic environment comprising:

means for establishing a standing pattern of ultrasonic acoustic waves in said environment;

first means for producing an output signal indicative of the amplitude of said acoustic waves at a predetermined point in said environment;

second means for producing an output signal pulse indicative of movement by said aquatic animals in response to a change in the output signal of said first means;

means for counting the output signal pulses of said second means;

means for periodically recording the count registered by said means for counting to produce a measure of the physical activity of said aquatic animals; and means for resetting said means for counting each time the count has been recorded.

11. The apparatus defined in claim 10 wherein said means for establishing comprises:

transmitter means for transmitting ultrasonic acoustic waves into said environment and surfaces disposed in the environment for reflecting the acoustic waves transmitted by said transmitter means to produce said standing wave pattern in the environment.

12. Apparatus for monitoring the level of physical activity of aquatic animals in an aquatic environment comprising:

means for establishing a standing pattern of ultrasonic acoustic waves in said environment;

first means for producing an output signal indicative of variations in the amplitude of said acoustic waves at a predetermined point in said environment due to physical movement of said aquatic animals; and second means responsive to the output signal of said first means for indicating the frequency of said variations as a measure of the level of physical activity of said aquatic animals.

13. The apparatus defined in claim 12 wherein said second means comprises:

a counter responsive to the output signal of said first means for counting said variations;

means for periodically recording the count registered by said counter; and means for resetting said counter each time the count has been recorded.

14. The apparatus defined in claim 12 wherein said first means comprises:

third means for producing an output signal indicative of the amplitude of said acoustic waves at said predetermined point in said environment;

AC coupling means for producing an output signal indicative of variations in the output signal of said third means; and threshold detecting means for producing an output signal pulse when the output signal of said AC coupling means exceeds a predetermined threshold level.

15. The apparatus defined in claim 14 wherein said second means comprises:

a counter for counting the output pulses of said threshold detecting means;

means for periodically recording the count registered by said counter; and means for resetting the counter each time the count has been recorded.

16. The apparatus defined in claim 12 wherein said means for establishing comprises:

transmitter means for transmitting ultrasonic acoustic waves into said environment and surfaces disposed in the environment for reflecting the acoustic waves transmitted by said transmitter means to produce said standing wave pattern in the environment.

17. Apparatus for monitoring the physical activity of aquatic animals in the water in an aquarium comprising:

means for establishing a standing pattern of ultrasonic acoustic waves in the water in said aquarium;

means for detecting the amplitude of the acoustic waves at a predetermined point in said aquarium;

means for producing an output indication of biological activity in response to a change in the amplitude of the acoustic waves detected by said means for detecting;

means for counting the output indications of biological activity produced by said means for producing;

means for periodically recording the count registered by said means for counting; and means for resetting said means for counting each time the count has been recorded.

18. The apparatus defined in claim 17 wherein said means for detecting comprises:

transducer means for producing an alternating current output signal having amplitude indicative of the amplitude of acoustic waves at said predetermined point in said aquarium and envelope detector means for producing an output signal representative of the amplitude envelope of the output signal of said transducer means.

19. The apparatus defined in claim 18 wherein said means for producing comprises:

AC coupling means for producing an electrical output signal indicative of fluctuations in the output signal of said envelope detector means and threshold detecting means for producing an electrical output signal pulse counted by said means for counting when the output signal of said AC coupling means exceeds a predetermined threshold level.

20. Apparatus for monitoring the level of physical activity of aquatic biological specimens in the water in an aquarium comprising:

means for generating an alternating current electrical signal;

a transmitting transducer responsive to said alternating current electrical signal for generating ultrasonic acoustic waves to produce a standing pattern of ultrasonic acoustic waves in the water in said aquarium;

a receiving transducer for producing an alternating current output signal having amplitude indicative of the amplitude of acoustic waves at a predetermined point in the water in said aquarium;

signal envelope detector means for producing an output signal indicative of the amplitude of the envelope of the receiving transducer output signal;

AC coupling means for producing an output signal indicative of fluctuations in the envelope detector output signal;

threshold detector means for producing an output signal pulse indicative of biological activity when the output signal of said AC coupling means exceeds a predetermined threshold level; and means for indicating the number of pulses produced by said threshold detector means per unit time interval as a measure of the level of physical activity of said biological specimens.

21. The apparatus defined in claim 20 wherein said means for producing comprises:

means for counting the output pulses produced by said threshold detector means;

means for periodically recording the count registered by said counter; and means for resetting said counter each time the count has been recorded.

22. Apparatus for monitoring the quality of water from a source comprising:

means for sampling the water from said source to produce a sample of water containing at least one aquatic animal;

means for establishing a standing wave pattern of ultrasonic acoustic waves in said sample of water;

first means for producing an output signal indicative of variations in the amplitude of said acoustic waves at a predetermined point in said sample due to physical movement of said aquatic animal; and second means responsive to the output signal of said first means for indicating the frequency of said variations as a measure of the quality of water from said source.

23. The apparatus defined in claim 22 wherein said second means comprises:

means for counting said variations;

means for periodically recording the count registered by said means for counting; and means for resetting said means for counting each time the count has been recorded.

24. The apparatus defined in claim 22 wherein said first means comprises:

third means for producing an output signal indicative of the amplitude of said acoustic waves at said predetermined point in said sample;

AC coupling means for producing an output signal indicative of variations in the output signal of said third means; and threshold detecting means for producing an output signal pulse applied to said second means when the output signal of said AC coupling means exceeds a predetermined threshold level.

25. The apparatus defined in claim 24 wherein said second means comprises:

means for counting the output pulses of said threshold detecting means;

means for periodically recording the count registered by said means for counting; and means for resetting said means for counting each time the count has been recorded.

26. Apparatus for monitoring the quality of water from a source comprising:

an aquarium containing water and at least one aquatic animal;

means for introducing water from said source into said aquarium at a predetermined rate;

means for establishing a standing pattern of ultrasonic acoustic waves in the water in said aquarium;

first means for producing an output signal indicative of the amplitude of acoustic waves at a predetermined point in said aquarium;

second means for producing an output signal pulse indicative of physical movement by said aquatic animal in response to a change in the output signal of said first means; and third means for indicating the frequency of the output signal pulses of said second means as a measure of the quality of water from said source.

27. The apparatus defined in claim 26 wherein said third means comprises:

a counter for counting the output signal pulses of said second means;

means for periodically recording the count registered by said counter; and means for resetting said counter each time the count has been recorded.

\* \* \* \* \*